US009614800B1

(12) United States Patent
Pulczinski et al.

(10) Patent No.: US 9,614,800 B1
(45) Date of Patent: Apr. 4, 2017

(54) THREADED DATALINK MESSAGE DISPLAY (71) Applicant: ROCKWELL COLLINS, INC., Cedar Rapids, IA (US)

(72) Inventors: Kristen L. Pulczinski, Hiawatha, IA (US); Tyler R. Krogmeier, Robins, IA (US); David J. Inman, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 575 days.

(21) Appl. No.: 14/158,333

(22) Filed: Jan. 17, 2014

(51) Int. Cl.
H04L 12/40 (2006.01)
H04L 12/58 (2006.01)
H04L 29/08 (2006.01)
H04L 12/24 (2006.01)

(52) U.S. Cl.
CPC ........ H04L 51/16 (2013.01); H04L 12/40163 (2013.01); H04L 41/026 (2013.01); H04L 51/26 (2013.01); H04L 67/12 (2013.01)

(58) Field of Classification Search
CPC .......... G08G 5/0013; G06G 7/70; G06F 8/71; G06F 3/04895; G01C 23/00; B64D 31/00; H04W 4/12; H04N 21/2146; H04L 51/28; H04L 12/40163; H04L 51/16; H04L 51/26; H04L 41/026
See application file for complete search history.

(56) References Cited

U.S. PATENT DOCUMENTS

| | | | |
|---|---|---|---|
| 6,313,759 B1 | 11/2001 | Musland-Sipper | |
| 7,495,602 B2 | 2/2009 | Sandell et al. | |
| 7,580,377 B2 | 8/2009 | Judd | |
| 7,860,642 B2 | 12/2010 | Sandell et al. | |
| 8,046,159 B2 | 10/2011 | Goodman et al. | |
| 8,244,452 B2 | 8/2012 | Judd et al. | |
| 8,428,793 B2 | 4/2013 | Mettes | |
| 2002/0023135 A1* | 2/2002 | Shuster | H04L 51/28 709/206 |
| 2005/0143871 A1* | 6/2005 | Boorman | G01C 23/00 701/3 |
| 2005/0228674 A1* | 10/2005 | Gunn | G06F 3/04895 704/270 |
| 2010/0048202 A1* | 2/2010 | Beacham, Jr. | H04W 4/12 455/431 |
| 2010/0332054 A1* | 12/2010 | Brandao | G08G 5/0013 701/3 |

(Continued)

Primary Examiner — Le H Luu
(74) Attorney, Agent, or Firm — Nolte & Associates PC (57) ABSTRACT A system for communicating between an operator of an aircraft and at least one entity may include a data-link device configured to transmit text messages from the operator of the aircraft to the at least one entity and configured to receive text messages transmitted by the at least one entity to the operator of the aircraft. The data-link device may include an input interface configured to permit the operator of the aircraft to compose the text messages to transmit to the at least one entity and a display module configured to display the text messages transmitted to the at least one entity and the text messages received from the at least one entity. The transmitted text messages and the received text messages may be displayed and chronologically listed in a message thread.

20 Claims, 5 Drawing Sheets (56) References Cited

U.S. PATENT DOCUMENTS

| | | | |
|---|---|---|---|
| 2011/0160940 A1* | 6/2011 | Schapiro | G08G 5/0013 701/14 |
| 2011/0202205 A1* | 8/2011 | Pepitone | B64D 31/00 701/3 |
| 2012/0174165 A1* | 7/2012 | Mondragon | H04N 21/2146 725/75 |
| 2013/0033387 A1* | 2/2013 | Trope | G01C 23/00 340/971 |
| 2013/0346081 A1* | 12/2013 | Loubiere | G08G 5/0013 704/260 |
| 2015/0148992 A1* | 5/2015 | McDonough | G06G 7/70 701/3 |
| 2016/0154642 A1* | 6/2016 | Mason | G06F 8/71 7/172 |

* cited by examiner

THREADED DATALINK MESSAGE DISPLAY

BACKGROUND

Aircraft operators (e.g., pilot and co-pilot) may communicate with one or more air traffic controllers or aircraft via text messages. Generally, the text messages transmitted by the pilot of the aircraft to the one or more air traffic controllers or aircraft may be displayed on a display module disposed in the cockpit of the aircraft.

Figure 1:
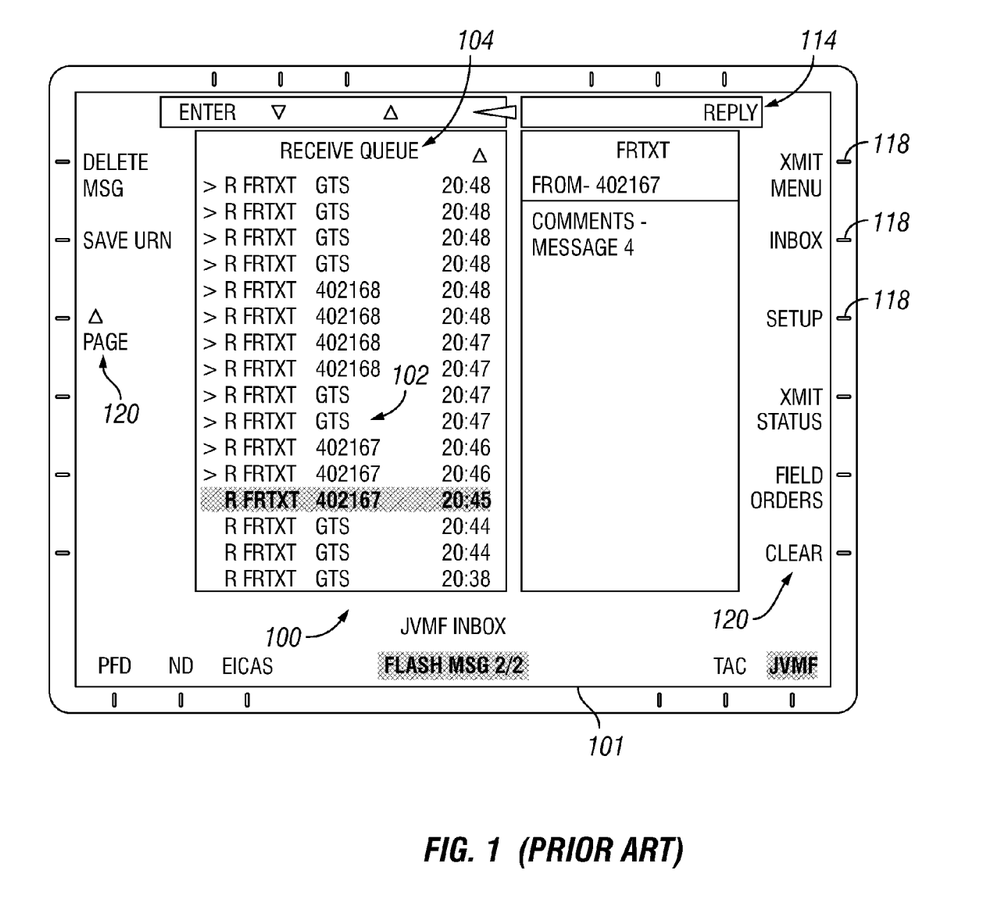
FIG. 1 illustrates a conventional message inbox displayed in the cockpit of an aircraft.

FIG. 1 illustrates a conventional message inbox 100 displayed on a display module 101 disposed in the cockpit of an aircraft. The message inbox 100 may include a receive queue 104. Text messages 102 received from the one or more air traffic controllers may be displayed in the receive queue 104. The message inbox 100 may also display the contents 114 of a selected text message 102. One or more commands 120, each corresponding to one or more push-buttons 118, may also be displayed on the display module 101 and a command 120 may be selected by pressing the corresponding push-button 118 disposed adjacent thereto.

Figure 2:
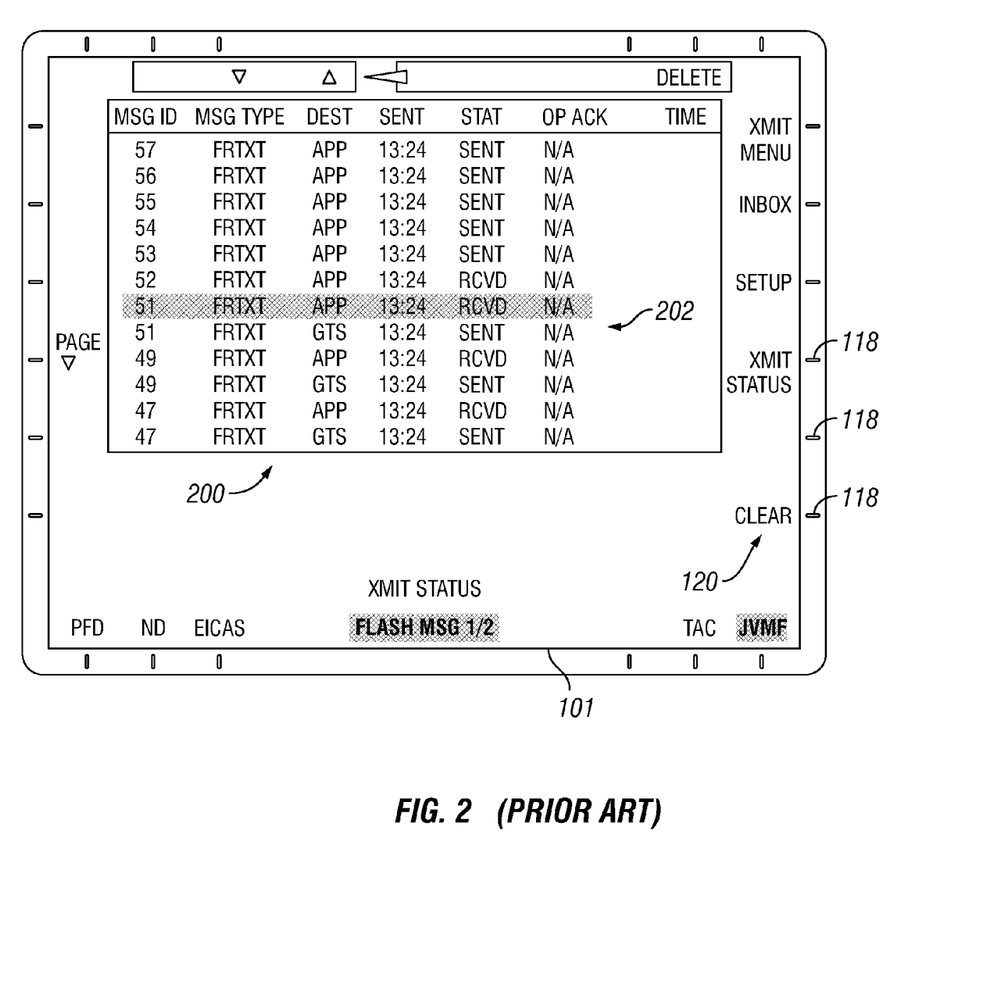
FIG. 2 illustrates a conventional transmit status page displayed in the cockpit of the aircraft.

FIG. 2 illustrates a conventional transmit status page 200 that may be displayed on the display module 101. For example, the transmit status page 200 may be displayed by pressing the push-button 118 adjacent the command "XMIT STATUS." The transmit status page 200 may list text messages 202 that may have been transmitted by the pilot to the one or more air traffic controllers. However, once the text message has been transmitted, the pilot may not be able to view the contents thereof. Additionally, the transmitted text messages and any received text messages may not be displayed simultaneously (e.g., side-by-side) on the display module. As a result, the pilot may have to switch the display on the display module between the transmitted text messages and the received text messages to view the desired text messages, which may be inconvenient.

What is needed, then, is a system for simultaneously displaying the transmitted and received text messages, and also displaying the contents of previously transmitted text messages.

SUMMARY

Example embodiments of the disclosure provide a system for communicating between an operator of an aircraft and at least one entity. The system may include a data-link device configured to transmit text messages from the operator of the aircraft to the at least one entity and configured to receive text messages transmitted by the at least one entity to the operator of the aircraft. The data-link device may include an input interface configured to permit the operator of the aircraft to compose the text messages to transmit to the at least one entity and a display module configured to display the text messages transmitted to the at least one entity and the text messages received from the at least one entity. The transmitted text messages and the received text messages may be displayed and chronologically listed in a message thread.

Example embodiments of the disclosure provide a computer-program product for displaying text messages exchanged between an operator of an aircraft and at least one entity. The computer-program product may comprise a non-transitory computer-readable medium having instructions stored thereon. The instructions may be executable by one or more processors. The instructions may include instructions for configuring a data-link system onboard the aircraft to transmit the text messages from the operator of the aircraft to the at least one entity. The data-link system may include an input interface configured to permit the operator of the aircraft to compose the text messages. The instruction may also include instructions for configuring the data-link system to receive text messages transmitted by the at least one entity to the operator of the aircraft and instructions for configuring the data-link system to display the transmitted text messages and the received text messages. The transmitted text messages and the received text messages may be displayed in a message thread on a display module of the data-link system. The transmitted text messages and the received text messages may be chronologically listed in the message thread.

Example embodiments of the disclosure provide a system for displaying text messages exchanged between an operator of an aircraft and a first entity, and between the operator of the aircraft and a second entity. Each of the first and second entities may include a plurality of members. The system may include a data-link device disposed onboard the aircraft. The data-link device may be configured to transmit text messages from the operator of the aircraft to the first and second entities and to receive text messages transmitted by the first and second entities to the operator of the aircraft. The data-link device may include an input interface configured to permit the operator of the aircraft to compose the text messages to transmit to the first and second entities and a display module configured to display the transmitted text messages and the received text messages. The text messages exchanged between the operator of the aircraft and the first entity may be displayed in a first message thread and the text messages exchanged between the operator of the aircraft and the second entity may be displayed in a second message thread. Each of the first and second message threads may include the respective transmitted and received text messages listed chronologically therein.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the present disclosure. Exemplary embodiments of components, arrangements, and configurations are described below to simplify the present disclosure; however, these exemplary embodiments are provided merely as examples and are not intended to limit the scope of the present disclosure. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and the claims to refer to particular components. As one skilled in the art will appreciate, various entities may refer to the same component by different names, and as such, the naming convention for the elements described herein is not intended to limit the scope of the present disclosure, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 3:
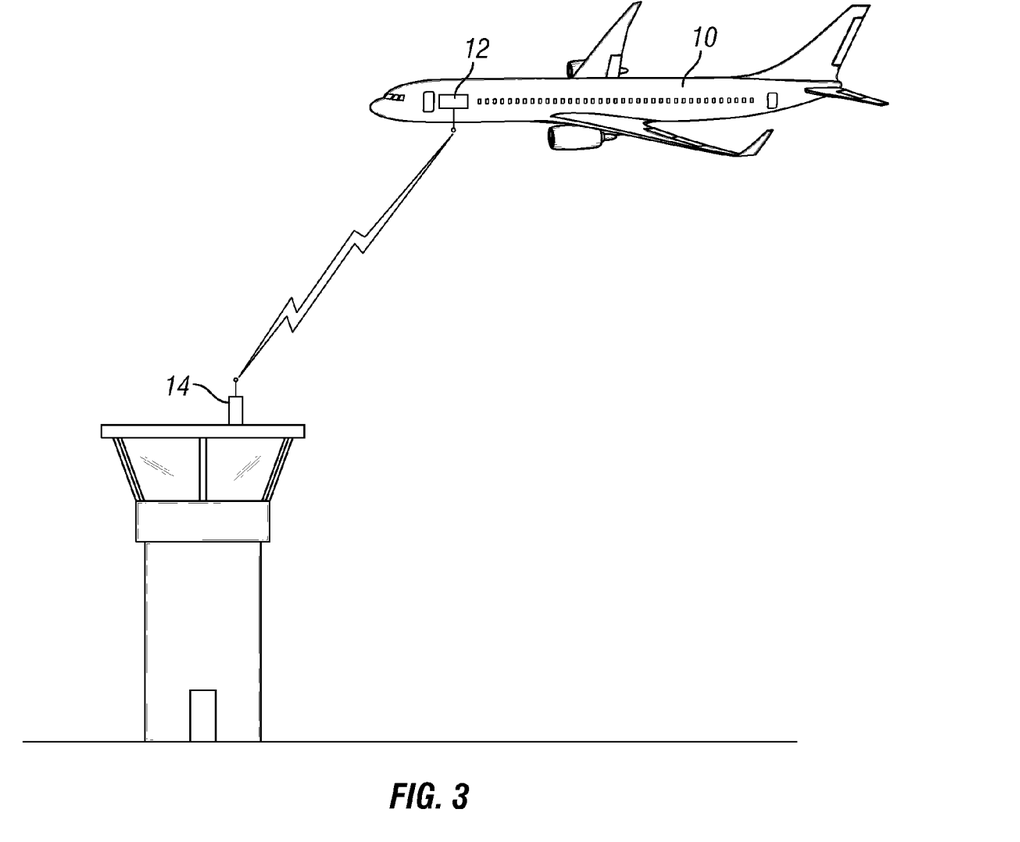
FIG. 3 illustrates an aircraft with a two-way data-link device disposed therein and in communication with an air traffic controller.

FIG. 3 illustrates an aircraft 10 with a two-way data-link device 12 disposed therein. The operator(s) of the aircraft 10 may send and receive messages to and from one or more air traffic controllers 14 (only one is illustrated) using the two-way data-link device 12. Although not illustrated, it should be noted that the two-way data-link device 12 may also be used by the operator(s) of the aircraft 10 to send and receive messages to and from operator(s) of one or more other aircrafts with whom the operator(s) of the aircraft 10 may be communicating. For the purposes of the discussion in the present disclosure, aircraft operator(s) may generally include pilot, co-pilot, ground personnel (e.g., airside operations personnel, airline flight dispatch and operations personnel, aircraft maintenance personnel, airport personnel, etc.) and any other individual that may desire access to information obtained directly or indirectly via the exchanged messages. Accordingly, although example embodiments discussed below are directed to displaying messages exchanged between a pilot of the aircraft 10 and entities 302, it will be understood that messages exchanged between the entities 302 and above-mentioned aircraft operators other than the pilot may also be displayed as discussed in the example embodiments below. It should further be noted that the two-way data-link device 12 may be a component of the aircraft's avionics system, e.g., the flight management system (FMS), disposed in the cockpit of the aircraft 10.

Figure 4:
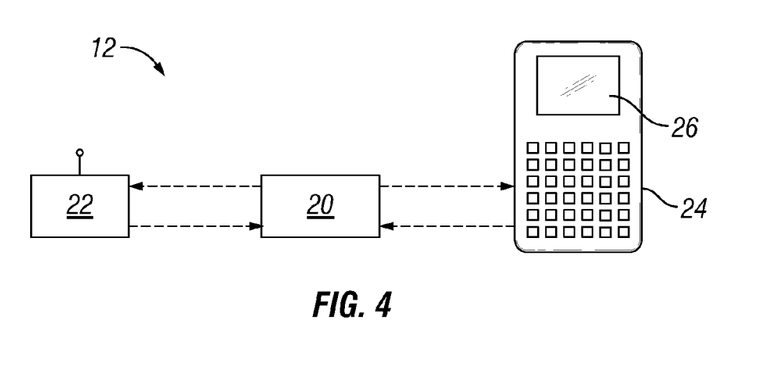
FIG. 4 is a schematic diagram of the two-way data-link device of FIG. 3.

FIG. 4 is a schematic diagram of the two-way data-link device 12 of FIG. 3. As shown in FIG. 4, the two-way data-link device (or system) 12 may include a processor 20, which may be electrically coupled to one or more memory modules (not shown) and may include data processing capability. A transceiver 22 may be connected to the processor 20 and may permit the processor 20 to communicate with the air traffic controller 14. An input interface 24 (e.g., a keypad, a keyboard, or the like) may permit the pilot (or co-pilot) of the aircraft 10 to input data to the processor 20, and a display module 26 (e.g., a CRT screen, a LCD screen, a touch screen, or the like) may permit the two-way data-link device 12 to visually prompt and notify the aircraft operator (s) of relevant information.

According to example embodiments, the two-way data-link device 12 may establish a communication link, e.g., Controller Pilot Data Link Communications (CPDLC), via which the air traffic controller 14 and the operator of the aircraft 10 may exchange text messages. The CPDLC may complement traditional voice communications and may provide aircraft operators and air traffic controllers with an additional communication medium for air traffic control. The text messages may be composed in the standardized format defined by the data-link device or the text messages may be composed as free-text messages which may not follow a defined format. The text messages may be displayed on the display module 26. The aircraft operator may respond via text messages that may be in the standardized format defined by the two-way data-link device 12 or via free-text messages. According to example embodiments, the two-way data-link device 12 may be a component of ACARS (Aircraft Communications Addressing and Reporting System, designed by Aeronautical Radio, Incorporated (ARINC)), a datalink system that may enable ground stations (air traffic controllers, airline operations centers, aircraft maintenance bases, etc.) and aircraft operators to communicate without voice, but via messages. The datalink system may be integrated with aircraft's avionics system, such as the Flight Management System (FMS).

Figure 5:
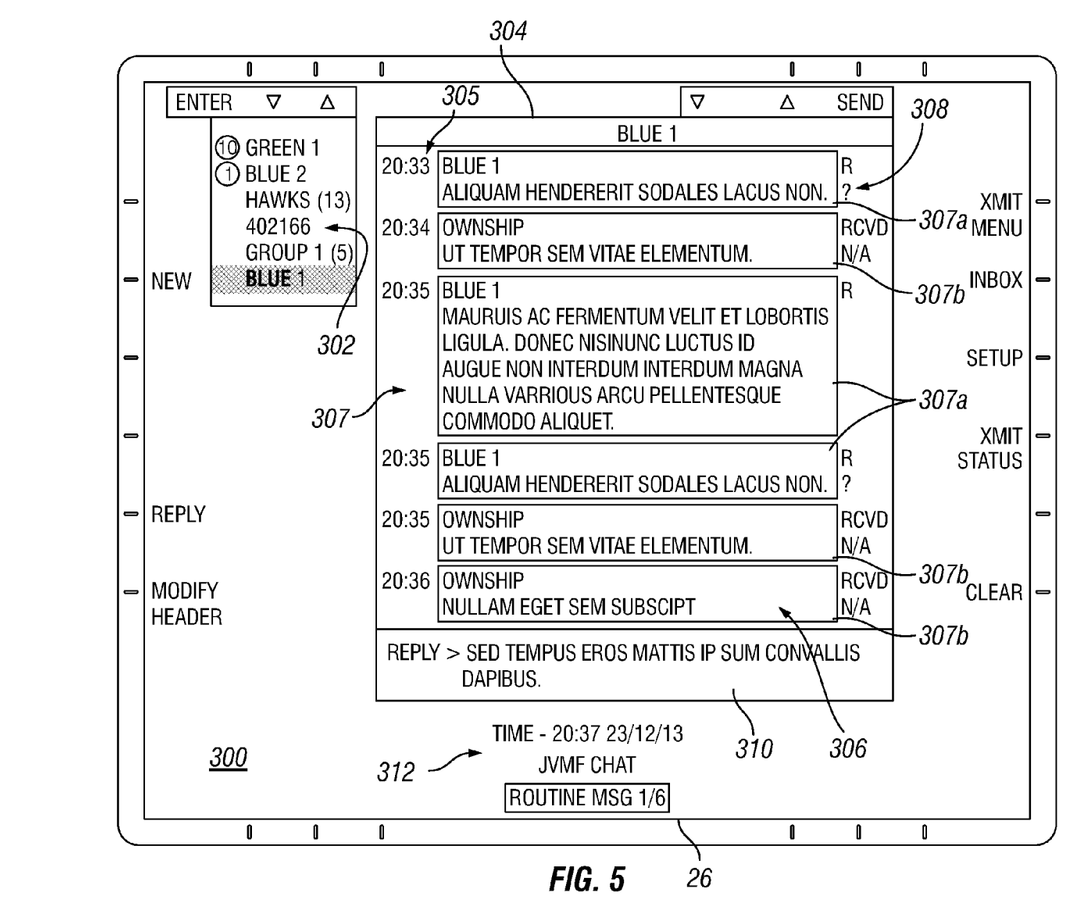
FIG. 5 illustrates a threaded message display displayed on the two-way data-link device in FIGS. 3 and 4, according to example embodiments.

FIG. 5 illustrates a threaded message display 300 displayed on the display module 26 of the two-way data-link device 12 in FIGS. 3 and 4, according to example embodiments. The threaded message display 300 may include a list of entities 302 with whom the pilot (referred to as OWNSHIP in the threaded message display 300) is currently exchanging messages. According to example embodiments, the entities 302 may include the one or more air traffic controllers 14 with whom the pilot of the aircraft 10 may be communicating. According to example embodiments, the entities 302 may also include pilots/co-pilots of one or more other aircraft with whom the pilot of the aircraft 10 may be communicating, ground personnel (e.g., airside operations personnel, airline flight dispatch and operations personnel, aircraft maintenance personnel, airport personnel, etc.), and any other individual that may desire access to information obtained directly or indirectly via the exchanged messages. The list of entities 302 may include the names or labels assigned to individual entities (having a single member) or the name or labels assigned to group entities having more than one member. For example, in FIG. 5, entities labeled GREEN 1, BLUE 2, 402166, and BLUE 1 may be individual entities, while entities labeled HAWKS and GROUP 1 may each be group entities including more than one member. A count indicating the number of members in a group entity may be displayed adjacent the group entity label. For example, as illustrated in FIG. 5, the count "13" adjacent the group entity HAWKS may indicate that the group entity HAWKS may include 13 members and the count "5" adjacent the group entity GROUP 1 may indicate that the group entity GROUP 1 may include 5 members. The members in the group entities may include the one or more air traffic controllers 14 with whom the pilot of the aircraft 10 may be communicating, the pilots of one or more other aircraft with whom the pilot of the aircraft 10 may be communicating, or both.

The list of entities 302 may be arranged in a chronological order with the entity to whom the most recent message was transmitted or from whom the most recent message was received appearing at the top of the list. As illustrated in FIG. 5, the entity GREEN 1 appears on the top of the list indicating that either entity GREEN 1 received the most recent message from the pilot OWNSHIP or entity GREEN 1 transmitted the most recent message to the pilot OWNSHIP. Herein, it should be noted that the entities 302 may be listed one below the other with the entity to whom the most recent message was transmitted or from whom the most recent message was received appearing at the top of the list.

Also displayed adjacent the entities is a count indicating a number of unread text messages of the text messages received from the corresponding entity. For example, as illustrated in FIG. 5, the count "10" adjacent the entity GREEN 1 may indicate that there are 10 text messages out of the text messages received from the entity GREEN 1 that have not yet been read by the pilot OWNSHIP.

The threaded message display 300 may further include a message area 304 that may display text messages 307 exchanged between an entity selected from the list of entities 302 and the pilot OWNSHIP. As illustrated in FIG. 5, entity BLUE 1 has been selected and the message area 304 may display text messages 307 exchanged between entity BLUE 1 and the pilot OWNSHIP. The text messages 307 may be displayed in the form of a message thread 306. Herein, a "message thread" may refer to a chronological listing of text messages 307 exchanged between the pilot and the selected entity. For example, in FIG. 5, entity BLUE 1 is selected (highlighted) from the list of entities 302 and the message thread 306 may include the text messages exchanged between the entity BLUE 1 and the pilot OWNSHIP. The message thread 306 may be displayed as a list of received and transmitted text messages 307a, 307b. The list may include the received and transmitted text messages 307a, 307b listed one below the other with the most recently received text message 307a or the most recently transmitted text message 307b being the bottom-most message in the list. For example, as illustrated in FIG. 5, the pilot OWNSHIP transmitted the most recent text message 307b at 20:36 hours; thus, the text message 307b appears as the bottom-most message in the message thread 306.

The text messages 307 may include received text messages 307a that may be received from the selected entity BLUE 1 by the pilot OWNSHIP and transmitted text messages 307b that may be transmitted by the pilot OWNSHIP to entity BLUE 1. In an example embodiment, the received text messages 307a and the transmitted text messages 307b may be displayed in different colors in order to differentiate between the received text messages 307a and the transmitted text messages 307b. In another example embodiment, different fonts may be used to differentiate between the received text messages 307a and the transmitted text messages 307b. In still another example embodiment, different colors and different fonts may be used to differentiate between the received text messages 307a and the transmitted text messages 307b. As illustrated in FIG. 5, the label of the entity from which each text message 307a is received (entity BLUE 1, in this case) and the label of the transmitter of each transmitted text message 307b (pilot OWNSHIP, in this case) may be displayed above each respective received and transmitted text message 307a, 307b.

A message status 308 of each received or transmitted text message 307a, 307b may also be displayed in the message display area 304 adjacent the respective received or transmitted text message 307a, 307b. For example, for received text messages 307a, the message status 308 may include a message priority indicator and an acknowledge requirement indicator. Referring to FIG. 5, all received text messages 307a are assumed to be low priority messages, also referred to as routine messages, and the priority thereof may be indicated as "R." However, in example embodiments, each received text message 307a may be assigned a different priority. Also, in FIG. 5, one or more of the received text messages 307a may have an "Acknowledgement Required" status message, represented by "?," indicating that the received text message 307a may require an acknowledgement by the pilot OWNSHIP (the recipient of the message). For transmitted text messages 307b, the message status 308 may include a transmit status indicator and an acknowledgement status indicator. In FIG. 5, the transmit status indicator may be represented by "RCVD," indicating that the transmitted text message 307b has been received by the entity BLUE 1. The acknowledgement status indicator may be represented by "N/A," indicating whether or not entity BLUE 1 has acknowledged receipt of the transmitted text message 307b.

The threaded message display 300 may also include a response field 310 in which the pilot OWNSHIP may compose a text message, e.g., the transmitted text message 307b. The text message may be composed in free-text using the input interface 24 (e.g., a keypad, a keyboard, or the like) shown in FIG. 4. Alternatively, the text message may be composed in the format specified by the data-link device. The threaded message display 300 may also display the time 305 at which each text message 307 was either received (307a) or transmitted (307b), and the current time 312 in order to provide a chronological reference for each received or transmitted text message 307a, 307b.

According to example embodiments, selecting the individual entity BLUE 1 from the list of entities 302 may display the message thread 306 including text messages 307 exchanged between entity BLUE 1 and pilot OWNSHIP. Similarly, selecting any other individual entity GREEN 1, BLUE 2, and 402166 may display a message thread including text messages exchanged between the selected individual entity and pilot OWNSHIP.

Figure 6:
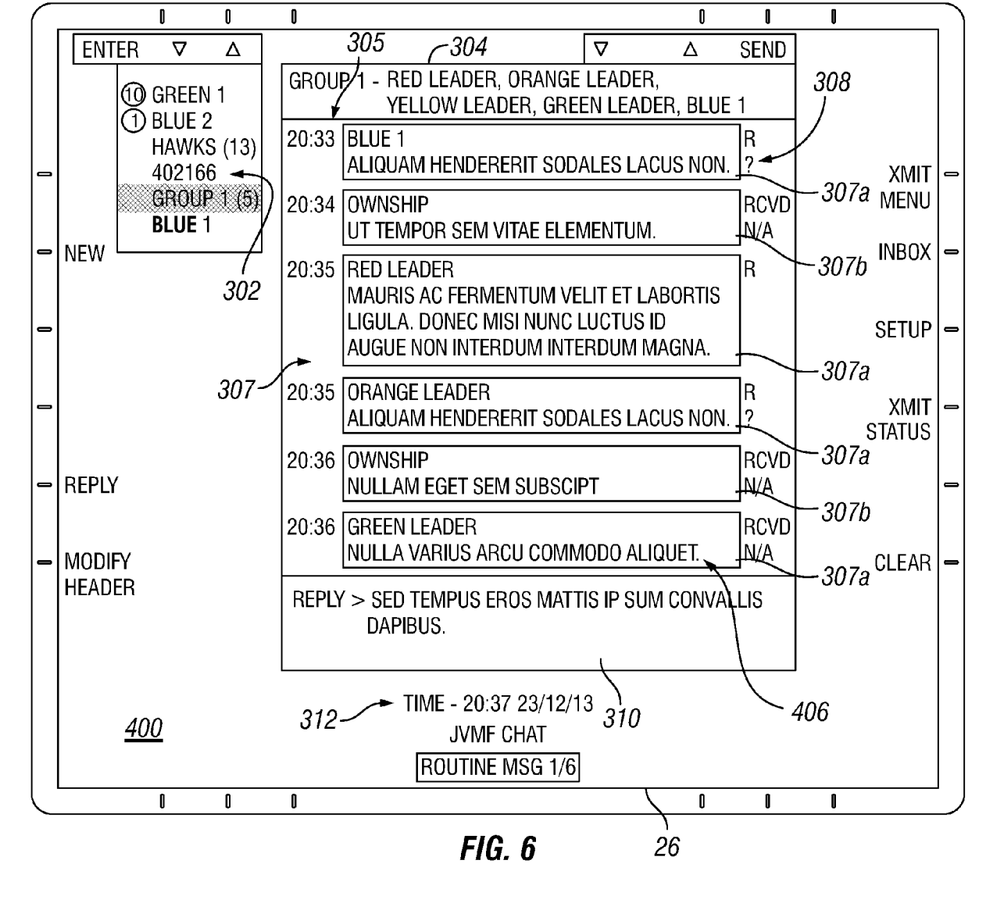
FIG. 6 illustrates another threaded message display displayed on the two-way data-link device in FIGS. 3 and 4, according to example embodiments.

FIG. 6 illustrates a threaded message display 400 displayed on the display module 26 of the two-way data-link device 12 in FIGS. 3 and 4, according to example embodiments. The threaded message display 400 may include a message thread 406 of text messages 307 exchanged between the pilot OWNSHIP and a group entity GROUP 1. As illustrated, group entity GROUP 1 may include 5 members—RED LEADER, ORANGE LEADER, YELLOW LEADER, GREEN LEADER, and BLUE 1. The threaded message display 400 may be similar in some respects to the threaded message display 300 described above and therefore may be best understood with reference to the description of FIG. 5 where like numerals designate like components and will not be described again in detail. As illustrated in FIG. 6, text messages 307 exchanged between the pilot OWNSHIP and the group entity GROUP 1 may be displayed in a message thread 406. The text messages 307 in the message thread 406 may be arranged chronologically with the most recently transmitted or received text message appearing at the bottom of the message thread 406. The text messages 307 may include received text messages 307a that may be received by the pilot OWNSHIP from members of the group entity GROUP 1 and transmitted text messages 307b that may be transmitted by the pilot OWNSHIP to all members of the group entity GROUP 1. As noted above, the received text messages 307a and the transmitted text messages 307b may be displayed in different colors, different fonts, or both in order to differentiate between the received text messages 307a and the transmitted text messages 307b.

According to example embodiments, selecting the group entity GROUP 1 from the list of entities 302 may display the message thread 406 including text messages 307 exchanged between members of the group entity GROUP 1 and the pilot OWNSHIP. Similarly, selecting group entity HAWKS may display a message thread including text messages exchanged between members of the group entity HAWKS and pilot OWNSHIP. According to example embodiments, if member(s) is/are added or deleted from a group entity, the messages exchanged thereafter with such a modified group entity may be displayed in a separate message thread. In an example embodiment, such a modified entity may be given a different label and may be listed in the list of entities 302 in the threaded message display 400. For example, if a member is deleted from the group entity GROUP 1, any messages exchanged thereafter between the modified group entity and the pilot OWNSHIP may be displayed in a message thread separate from the message thread 406. Also, the modified group entity may be given a different label (e.g., GROUP 2, not shown) and may be listed in the list of entities 302 in the threaded message display 400.

Example embodiments disclosed above may enable the pilot to relatively quickly and efficiently recall previously transmitted text messages which is currently not possible in existing data-link devices/systems. This ease of access to previously transmitted text messages may permit the pilot to relatively quickly and accurately respond to a situation that may arise while operating the aircraft. In addition, the threaded message displays 300, 400, according to example embodiments disclosed above, may be implemented on data-link devices that may have a limited amount of memory resources and on existing display modules of the data-link devices.

It should be noted that the data-link device 12 may display the threaded message displays 300, 400 on the display module 26 in addition to displaying the message inbox 100 and transmit status page 200 in FIGS. 1 and 2, respectively. Further, it should be noted that, although example embodiments above have been described with respect to messages composed in free-text, example embodiments may be equally applicable to messages composed in any desired standardized format of the data-link device being used.

Example embodiments may also be directed to a computer-program product for displaying text messages 307 exchanged between the operator of the aircraft and one or more entities 302. The computer-program product may include one or more instructions stored on a computer-readable medium and executable by one or more processors (e.g., the processor 20). A computer-readable media may be any available media that may be accessed by a computer. By way of example, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray (Registered Trademark) disc where disks usually reproduce data magnetically, while discs reproduce data optically with lasers.

Software or instructions may also be transmitted over a transmission medium. For example, when the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A system for communicating between an operator of an aircraft and at least one entity, comprising:
    a data-link device configured to transmit text messages from the operator of the aircraft to the at least one entity and configured to receive text messages transmitted by the at least one entity to the operator of the aircraft, the data-link device comprising:
        an input interface configured to permit the operator of the aircraft to compose the text messages to transmit to the at least one entity; and
        a display module configured to display the text messages transmitted to the at least one entity and the text messages received from the at least one entity, the transmitted text messages and the received text messages being displayed and chronologically listed in a message thread,
        wherein the display module is further configured to display a message status of each of the received text messages and the transmitted text messages, the message status including a message priority indicator and an acknowledge requirement indicator.

2. The system of claim 1, wherein the display module is further configured to chronologically display a list of labels assigned to a plurality of entities on the display module, a label assigned to the at least one entity being one of the labels displayed in the list of labels, and the labels being displayed one below the other with a label of an entity to whom the most recent text message was transmitted or from whom the most recent text message was received appearing at the top of the list.

3. The system of claim 1, wherein the display module is further configured to simultaneously display a label assigned to the at least one entity and the message thread associated with the at least one entity adjacent to each other on the display module.

4. The system of claim 1, wherein the at least one entity is an individual entity including a single member.

5. The system of claim 1, wherein the at least one entity includes a plurality of members.

6. The system of claim 5, wherein the display module is further configured to display a count of the plurality of members included in the at least one entity.

7. The system of claim 1, wherein the display module is further configured to display a count of unread text messages of the text messages received by the operator of the aircraft from the at least one entity.

8. The system of claim 1, wherein the display module is further configured to display the time at which each text message was received from the at least one entity and the time at which each text message was transmitted to the at least one entity.

9. The system of claim 1, wherein the display module is further configured to display the composed text messages in a response field of the display module, the text messages being composed in a free-text format.

10. The system of claim 1, wherein the display module is further configured to display the transmitted text messages and the received text messages in at least one of different colors and different fonts.

11. A computer-program product for displaying text messages exchanged between an operator of an aircraft and at least one entity, the computer-program product comprising a non-transitory computer-readable medium having instructions stored thereon, the instructions being executable by one or more processors, and the instructions comprising:
instructions for configuring a data-link system onboard the aircraft to transmit the text messages from the operator of the aircraft to the at least one entity, the data-link system comprising an input interface configured to permit the operator of the aircraft to compose the text messages;
instructions for configuring the data-link system to receive text messages transmitted by the at least one entity to the operator of the aircraft;
instructions for configuring the data-link system to display the transmitted text messages and the received text messages, the transmitted text messages and the received text messages being displayed in a message thread on a display module of the data-link system, and the transmitted text messages and the received text messages being chronologically listed in the message thread; and
instructions for configuring the data-link system to display a message status of each of the received text messages and the transmitted text messages, the message status including a message priority indicator and an acknowledge requirement indicator.

12. The computer-program product of claim 11, further comprising:
instructions for configuring the data-link system to simultaneously display a label assigned to the at least one entity and the message thread associated with the at least one entity adjacent to each other on the display module.

13. The computer-program product of claim 11, further comprising:
instructions for configuring the data-link system to display the time at which each text message was received from the at least one entity and the time at which each text message was transmitted to the at least one entity.

14. The computer-program product of claim 11, further comprising:
instructions for configuring the data-link system to display a count of unread text messages of the text messages received from the at least one entity.

15. The computer-program product of claim 11, further comprising: instructions for configuring the data-link system to chronologically display a list of labels assigned to a plurality of entities, a label assigned to the at least one entity being one of the labels displayed in the list of labels, and the labels being displayed one below the other with a label of an entity to whom the most recent text message was transmitted or from whom the most recent text message was received appearing at the top of the list.

16. The computer-program product of claim 11, wherein the at least one entity includes a plurality of members and the instructions further comprise:
instructions for configuring the data-link system to modify the at least one entity by adding or deleting one or more members thereof to create a modified entity, the display module configured to display text messages exchanged between the modified entity and the operator of the aircraft in another message thread, wherein the another message thread chronologically lists the text messages exchanged between the operator of the aircraft and the modified entity.

17. A system for displaying text messages exchanged between an operator of an aircraft and a first entity including a first plurality of members and between the operator of the aircraft and a second entity including a second plurality of members, the system comprising:
a data-link device disposed onboard the aircraft and configured to transmit text messages from the operator of the aircraft to the first and second entities and to receive text messages transmitted by the first and second entities to the operator of the aircraft, the data-link device comprising:
an input interface configured to permit the operator of the aircraft to compose the text messages to transmit to the first and second entities; and
a display module configured to display the transmitted text messages and the received text messages, the text messages exchanged between the operator of the aircraft and the first entity being displayed in a first message thread and the text messages exchanged between the operator of the aircraft and the second entity being displayed in a second message thread, each of the first and second message threads comprising the respective transmitted and received text messages listed chronologically therein,
wherein the display module is further configured to display a message status of each of the received text messages and the transmitted text messages, the message status including a message priority indicator and an acknowledge requirement indicator.

18. The system of claim 17, wherein the display module is further configured to display a count of unread text messages of the text messages received from each of the first and second entities.

19. The system of claim 17, wherein the display module is further configured to list labels assigned to the first and second entities such that the label of the entity to which the most recent text message was transmitted or from whom the most recent text message was received appears at the top of the list.

20. The system of claim 17, wherein the display module is further configured to display the composed text messages in a response field of the display module, the text messages being composed in a free-text format.

* * * * *